(12) United States Patent
Sho

(10) Patent No.: US 12,170,473 B2
(45) Date of Patent: Dec. 17, 2024

(54) SHAFT AND ROTATING MACHINE

(71) Applicant: MEIDENSHA CORPORATION, Tokyo (JP)

(72) Inventor: Shinhaku Sho, Tokyo (JP)

(73) Assignee: MEIDENSHA CORPORATION, Tokyo (JP)

(*) Notice: Subject to any disclaimer, the term of this patent is extended or adjusted under 35 U.S.C. 154(b) by 0 days.

(21) Appl. No.: 18/568,704

(22) PCT Filed: Jun. 9, 2022

(86) PCT No.: PCT/JP2022/023262
§ 371 (c)(1),
(2) Date: Dec. 8, 2023

(87) PCT Pub. No.: WO2022/260123
PCT Pub. Date: Dec. 15, 2022

(65) Prior Publication Data
US 2024/0266909 A1  Aug. 8, 2024

(30) Foreign Application Priority Data

Jun. 10, 2021 (JP) ................................. 2021-097520

(51) Int. Cl.
| H02K 7/00 | (2006.01) |
| F16C 3/02 | (2006.01) |
| H02K 5/173 | (2006.01) |
| H02K 7/08 | (2006.01) |

(52) U.S. Cl.
CPC .............. *H02K 7/003* (2013.01); *F16C 3/02* (2013.01); *H02K 5/1732* (2013.01); *H02K 7/083* (2013.01); *F16C 2380/26* (2013.01)

(58) Field of Classification Search
CPC ...... H02K 7/003; H02K 5/1732; H02K 7/083; F16C 3/02; F16C 2380/26
USPC .......................................................... 310/90
See application file for complete search history.

(56) References Cited

U.S. PATENT DOCUMENTS

| 8,786,150 B2 | 7/2014 | Minami et al. |
| 2016/0108895 A1 | 4/2016 | Holloway et al. |

FOREIGN PATENT DOCUMENTS

| CN | 202475103 U | 10/2012 |
| CN | 111075663 A | 4/2020 |
| JP | S53-045336 U | 4/1978 |
| JP | S63-198355 U | 12/1988 |
| JP | 2000-156952 A | 6/2000 |
| JP | 2005-212713 A | 8/2005 |

(Continued)

*Primary Examiner* — Terrance L Kenerly
(74) *Attorney, Agent, or Firm* — Foley & Lardner LLP

(57) ABSTRACT

A shaft configured to suppress damage without having an increased diameter is provided. The shaft includes a supported portion supported by a bearing and an adjacent large-diameter portion larger in diameter than the supported portion and disposed closer to a center in an axial direction than the supported portion. The shaft is configured to rotate integrally with a rotor while holding the rotor. A sectional shape of a boundary portion between the supported portion and the large-diameter portion in a longitudinal section of the shaft is an arc shape that is, on an outer side in the axial direction with respect to a virtual rising point, recessed inward from an outer edge in the radial direction of the supported portion and raised outward in the radial direction from the outer edge, as the arc shape extends from the outer to an inner side in the axial direction.

4 Claims, 9 Drawing Sheets

(56) References Cited

FOREIGN PATENT DOCUMENTS

| | | |
|---|---|---|
| JP | 2009-156450 A | 7/2009 |
| JP | 2012-055110 A | 3/2012 |

SHAFT AND ROTATING MACHINE

TECHNICAL FIELD

The present invention relates to a rotating machine such as a motor and a generator (dynamo), and a shaft installed in the rotating machine.

BACKGROUND ART

Conventionally, a shaft described in Patent Literature 1 is known as a shaft to be installed in a rotating machine such as a motor. The shaft includes a small-diameter portion as a supported portion and a large-diameter portion, and rotates integrally with a rotor of the rotating machine while holding the rotor. The supported portion of the shaft is rotatably supported by a roller bearing. In addition, the large-diameter portion of the shaft is disposed closer to the center in the direction of a rotation axis than the supported portion is, the large-diameter portion being adjacent to the supported portion.

CITATION LIST

Patent Literature

Patent Literature 1: JP 2000-156952 A

SUMMARY OF INVENTION

Technical Problem

Hereinafter, a direction along the rotation axis of the shaft and a direction parallel to the rotation axis of the shaft are collectively referred to simply axial direction. In addition, the radial direction around the rotation axis of the shaft is simply referred to as radial direction. In addition, the circumferential direction around the rotation axis of the shaft is simply referred to as circumferential direction.

In general, a roller bearing includes a plurality of balls disposed to be arranged in a circumferential direction, an outer ring disposed outside the plurality of balls in the radial direction, and an inner ring disposed inside the plurality of balls in the radial direction. A shaft is fitted inside the inner ring. The outer ring is fixed to a pillar or the like of the rotating machine, whereas the inner ring rotates together with the shaft.

In each drawing of Patent Literature 1, an inner ring of a roller bearing is drawn in a shape in which a side surface of the inner ring rises at substantially a right angle from an inner circumferential surface. In the inner ring having such a shape, the supported portion of the shaft is damaged by a sharp edge formed at a boundary between the side surface and the inner circumferential surface, and the life of the shaft is easily reduced. Specifically, the supported portion of the shaft is fitted in the roller bearing in a state of being biased from the outside to the inside in the axial direction for alignment in the axial direction. By the above-described biasing, stress concentrates on a contact portion between a sharp edge and an outer circumferential surface of the supported portion, the sharp edge having been formed at the boundary between the side surface on the inner side (the side facing an end face of the large-diameter portion) and the inner circumferential surface of the inner ring, so that the edge damages the outer circumferential surface of the supported portion.

Therefore, it is desirable that the boundary portion between the side surface on the inner side and the inner circumferential surface of the inner ring of the roller bearing be chamfered in an arc shape. In addition, it is desirable that the boundary portion between the supported portion and the large-diameter portion of the shaft be formed in an arc shape. Specifically, the boundary portion is formed in a shape rising in an arc shape on the outer side in the axial direction with respect to a virtual rising point, the virtual rising point being given when a rising angle of the large-diameter portion from the supported portion is assumed to be a right angle. In such a configuration, the arc-chamfered portion formed at the boundary between the side surface on the inner side and the inner circumferential surface of the inner ring abuts against an arc-shaped boundary portion located at the boundary between the supported portion and the large-diameter portion of the shaft. In such abutting, as compared with a configuration in which the sharp edge of the inner ring is pressed against the outer circumferential surface of the supported portion of the shaft, it is possible to reduce stress concentration and suppress damage to the shaft.

However, in order to satisfactorily reduce the stress concentration, it is necessary to increase the curvature radius of the arc-shaped boundary portion disposed at the boundary between the supported portion and the large-diameter portion of the shaft as much as possible. For this reason, increasing the diameter of the shaft becomes necessary, so that the rotating machine may become large in size.

The present invention has been made in view of the above background, and an object of the present invention is to provide a shaft capable of suppressing damage to the shaft without increasing the diameter of the shaft, and a rotating machine in which the shaft is installed.

Solution to Problem

In order to achieve the above object, the present invention provides a shaft including: a supported portion that is rotatably supported by a bearing; and a large-diameter portion that is disposed closer to a center in an axial direction than the supported portion is, is adjacent to the supported portion, and has a larger diameter than the supported portion, and has a larger diameter than the supported portion, the bearing being disposed such that a side surface of the bearing faces and comes close to an end face of the large-diameter portion on a side of the supported portion, the shaft being configured to rotate integrally with a rotor while holding the rotor, wherein a sectional shape of a boundary portion between the supported portion and the large-diameter portion in a longitudinal section of the shaft is formed in an arc shape that, on an outer side in the axial direction with respect to a virtual rising point, the virtual rising point being given when a rising angle of the large-diameter portion from the supported portion is assumed to be a right angle, has a radius of curvature larger than a radius of curvature of a concave corner formed by an outer edge of the supported portion and the end face of the large-diameter portion and is recessed inward in a radial direction of the supported portion.

Advantageous Effects of Invention

According to the present invention, there is an excellent effect by which damage to a shaft can be suppressed without increasing the diameter of the shaft.

DESCRIPTION OF EMBODIMENTS

Figure 1:
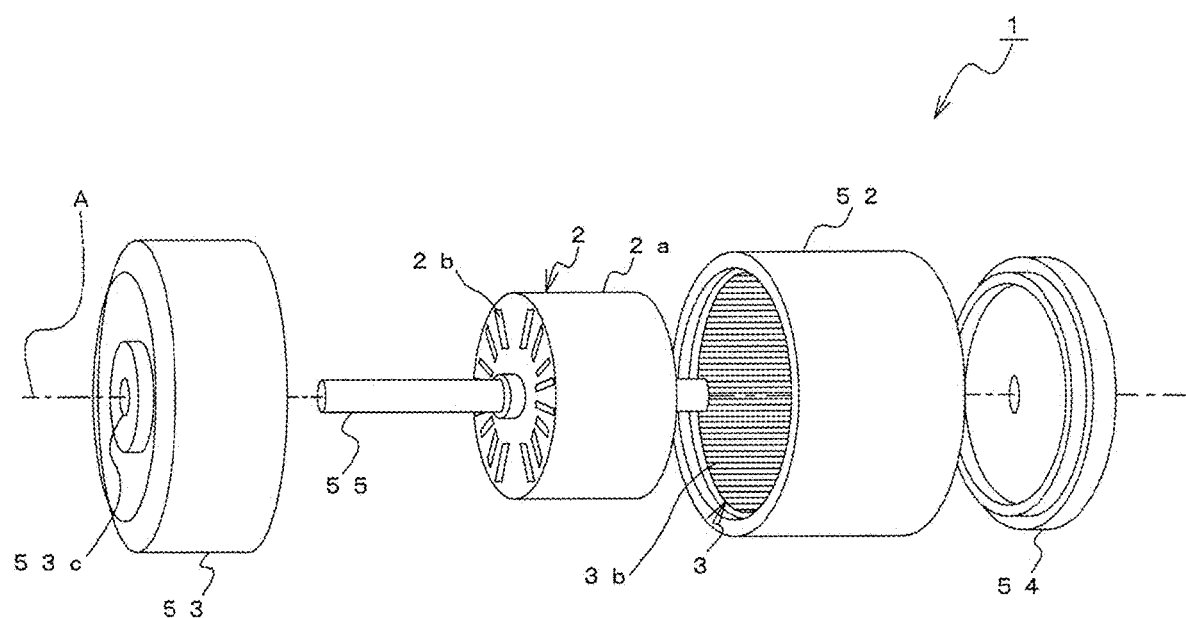
FIG. 1 is an exploded perspective view illustrating a motor according to an embodiment.

Hereinafter, an embodiment of a motor as a rotating machine to which the present invention is applied will be described with reference to the drawings.

In the embodiment, for ease of description, structures and elements other than the main parts of the present invention will be described in a simplified or omitted manner. In each drawing, the same elements are denoted by the same reference numerals. Shapes, dimensions, and the like of each element depicted in each drawing are schematically illustrated, and do not indicate actual shapes, dimensions, and the like.

Hereinafter, an embodiment is described in which one side in an axial direction is a rear side and the other side in the axial direction is a front side.

First, a basic configuration of a rotating machine according to the embodiment will be described.

FIG. 1 is an exploded perspective view illustrating a motor 1 according to the embodiment. The motor 1 is an inner-rotor motor, and includes a housing 52 with a cylindrical shape, a front cover 53, a rear cover 54, a shaft 55, a rotor (rotary element) 2, and a stator (stationary element) 3. The rotor 2 is a magnet-embedded rotary element. The motor 1 is an interior permanent magnet synchronous motor (IPMSM) for a vehicle motor or the like that is required to have a high output density.

The shaft 55 with a rounded bar shape passes through the rotor 2 with a cylindrical shape along a rotation axis A of the rotor 2 and is located on the rotation axis A. The shaft 55 rotates together with and drives the rotor 2 around the rotation axis A. The housing 52 with a cylindrical shape serves as a yoke and holds the stator 3 with a cylindrical shape on an inner circumferential surface. The housing 52 has openings at both ends in the direction of the rotation axis A. The rotor 2 is accommodated in a hollow space in the stator 3 held on the inner circumferential surface of the housing 52. The front cover 53 with a bottomed cylindrical shape is connected to the front side of the housing 52 in a state where the bottom of the front cover 53 is directed to the front side in the axial direction (direction parallel to the rotation axis A). With this connection, the front cover 53 allows the front side of the shaft 55 to pass through a shaft hole 53c provided in the bottom and closes a front opening of the housing 52.

The rear cover 54 is fixed to a rear end of the housing 52 so as to close a rear opening of the housing 52.

The stator 3 is disposed on an outer circumferential side of the rotor 2 with an air gap between the stator 3 and the rotor 2. That is, the stator 3 having a hollow structure accommodates the rotor 2 in the hollow. The motor 1 sequentially switches magnetic fields of the stator 3 by the current control on a coil to generate attraction or repulsion with magnetic fields of the rotor 2, so as to rotate and drive the rotor 2 around the rotation axis A.

The rotor 2 includes a rotor core 2a and a plurality of permanent magnets 2b. The rotor core 2a of the rotor 2 is, for example, a cylindrical member formed by laminating punched silicon steel plates in the axial direction. An insulating adhesive is interposed between the individual silicon steel plates constituting the rotor core 2a, and the individual silicon steel plates are insulated from each other. The shaft 55 is fitted in the hollow formed in the axial center of the rotor core 2a, along the rotation axis A. In the motor 1, the shaft 55 is rotatably supported by a roller bearing that is not illustrated.

Figure 2:
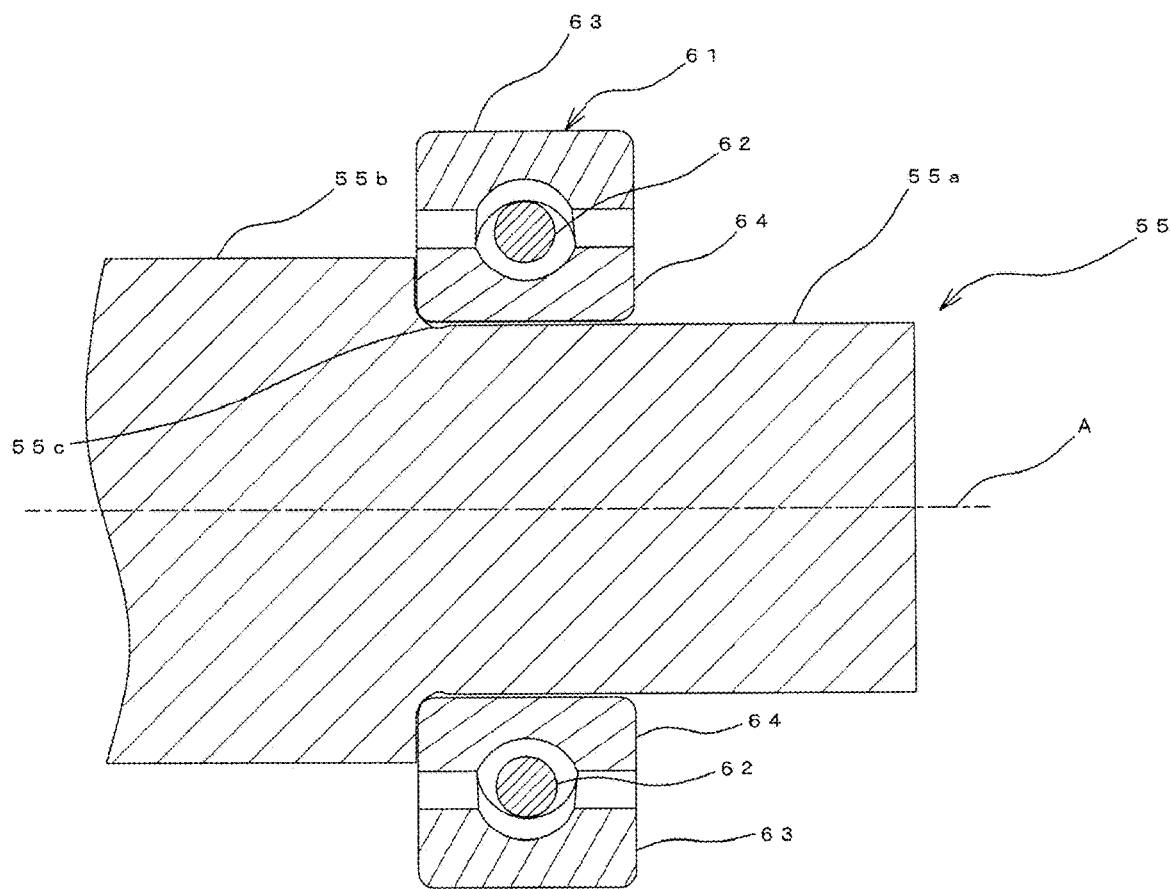
FIG. 2 is a sectional view illustrating a rear end in an axial direction in a longitudinal section of a shaft in the motor together with a rear roller bearing.

FIG. 2 is a sectional view illustrating a rear end in the axial direction in a longitudinal section of the shaft 55 together with a rear roller bearing. The shaft 55 includes a rear supported portion 55a as a supported portion, a large-diameter portion 55b, and a rear boundary portion 55c as a boundary portion. The rear supported portion 55a as a one-side supported portion is rotatably supported by a rear roller bearing 61. The large-diameter portion 55b is disposed closer to the center in the axial direction than the rear supported portion 55a is, is adjacent to the rear supported portion 55a, and has a larger diameter than the rear supported portion 55a. The rear boundary portion 55c is located at the boundary between the rear supported portion 55a and the large-diameter portion 55b in the axial direction.

The rear roller bearing 61 includes a plurality of balls 62 disposed to be arranged at a predetermined pitch in a circumferential direction, an outer ring 63 with a ring shape disposed outside the plurality of balls 62 in the radial direction, and an inner ring 64 with a ring shape disposed inside the plurality of balls 62 in the radial direction. The rear supported portion 55a of the shaft 55 is fitted into a center hole of the inner ring 64. The shaft 55 holds the rotor (2 in FIG. 1) on the outer circumferential surface of the large-diameter portion 55b.

Figure 3:
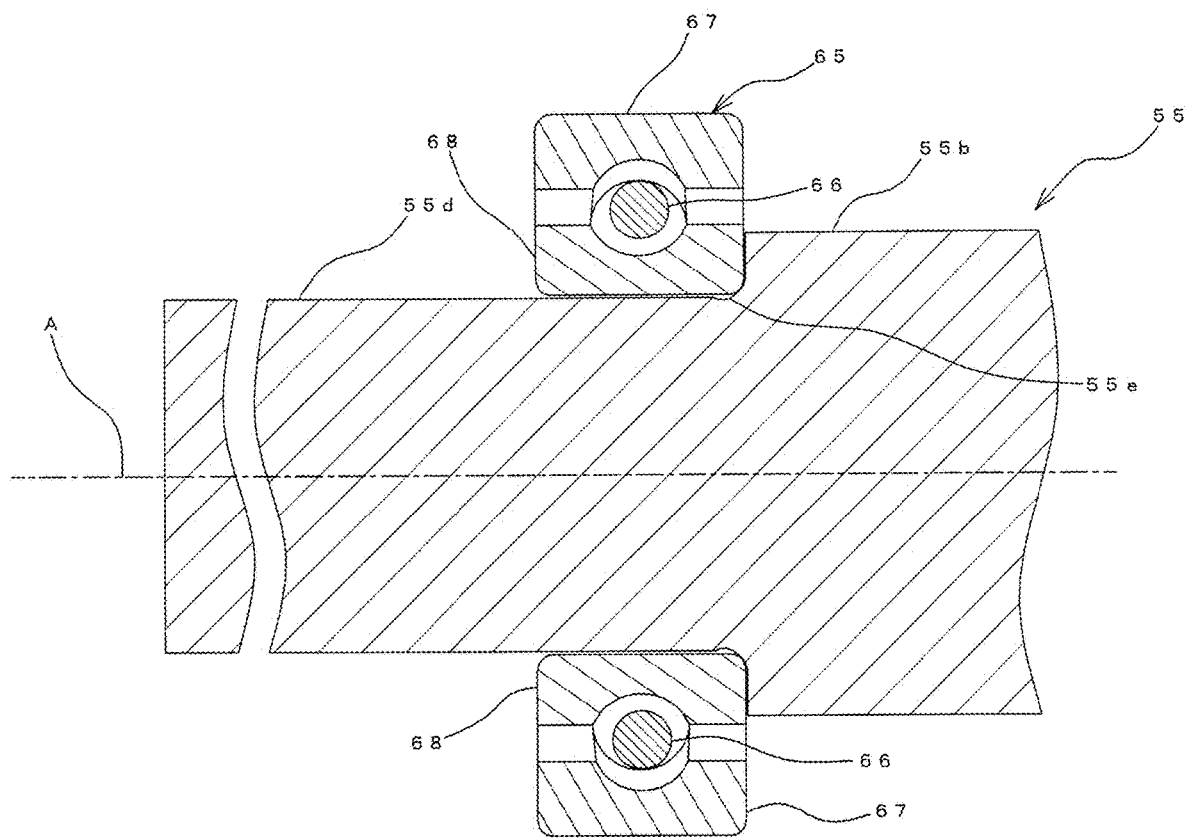
FIG. 3 is a sectional view illustrating a front end in the axial direction in a longitudinal section of the shaft together with a front roller bearing.

FIG. 3 is a sectional view illustrating a front end in the axial direction in a longitudinal section of the shaft 55 together with a front roller bearing. The shaft 55 includes a front supported portion 55d as a supported portion and a front boundary portion 55e as a boundary portion. The front supported portion 55d as an other-side supported portion is rotatably supported by a front roller bearing 65. The diameter of the front supported portion 55d is the same as the diameter of the rear supported portion 55a in FIG. 2. The large-diameter portion 55b is located between the rear supported portion 55a and the front supported portion 55d in the axial direction. The front boundary portion 55e is located at the boundary between the front supported portion 55d and the large-diameter portion 55b in the axial direction.

The front roller bearing 65 includes a plurality of balls 66 disposed to be arranged at a predetermined pitch in a circumferential direction, an outer ring 67 with a ring shape disposed outside the plurality of balls 66 in the radial direction, and an inner ring 68 with a ring shape disposed inside the plurality of balls 66 in the radial direction. The front supported portion 55d of the shaft 55 is fitted into a center hole of the inner ring 68.

Figure 4:
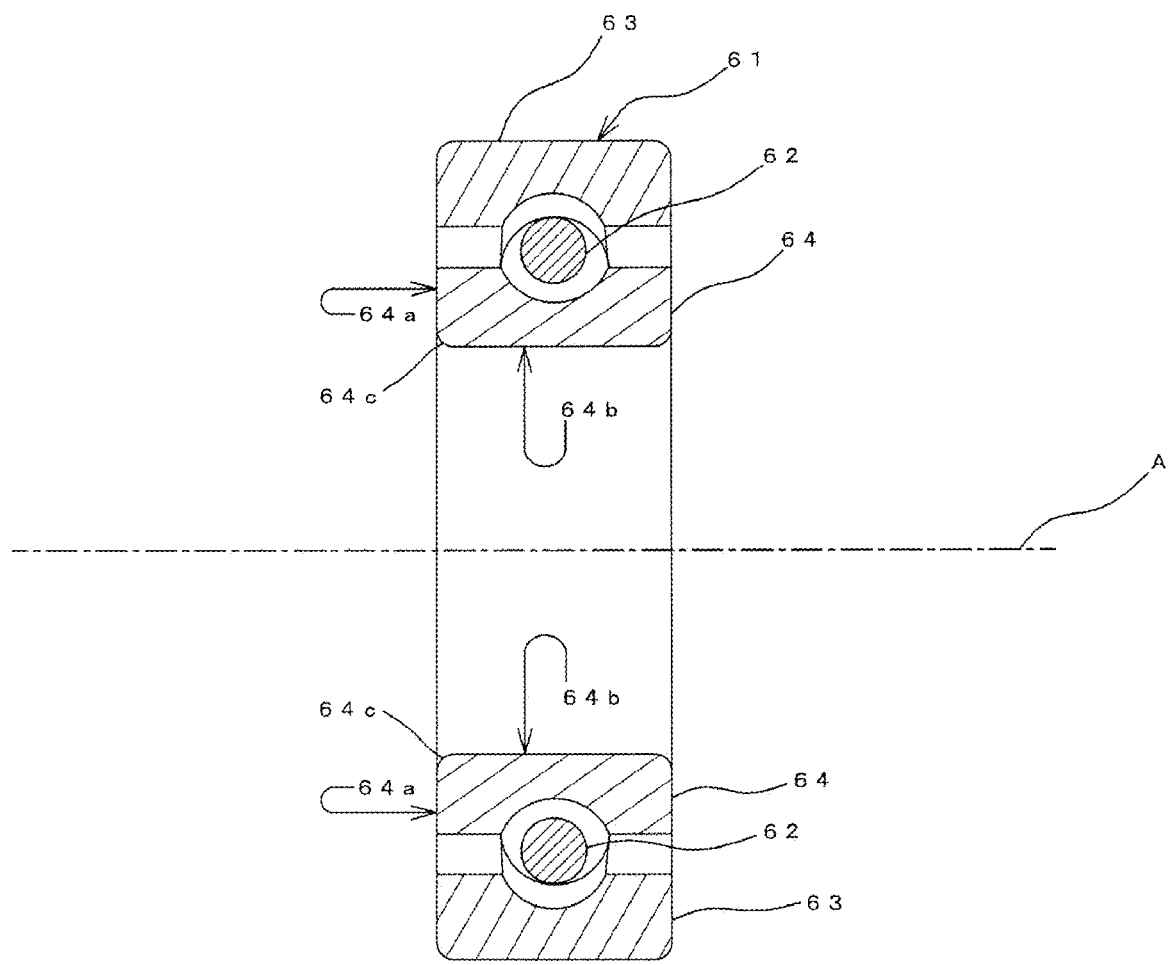
FIG. 4 is a sectional view illustrating the rear roller bearing of the motor.

FIG. 4 is a sectional view illustrating the rear roller bearing 61. The inner ring 64 of the rear roller bearing 61 includes a chamfered portion 64c with an arc shape at the boundary between a side surface 64a on an inner side in the axial direction (the side facing a rear end face of the large-diameter portion of the shaft) and an inner circumferential surface 64b.

Next, a shaft of a general rotating machine to which the present invention is not applied will be described.

Figure 7:
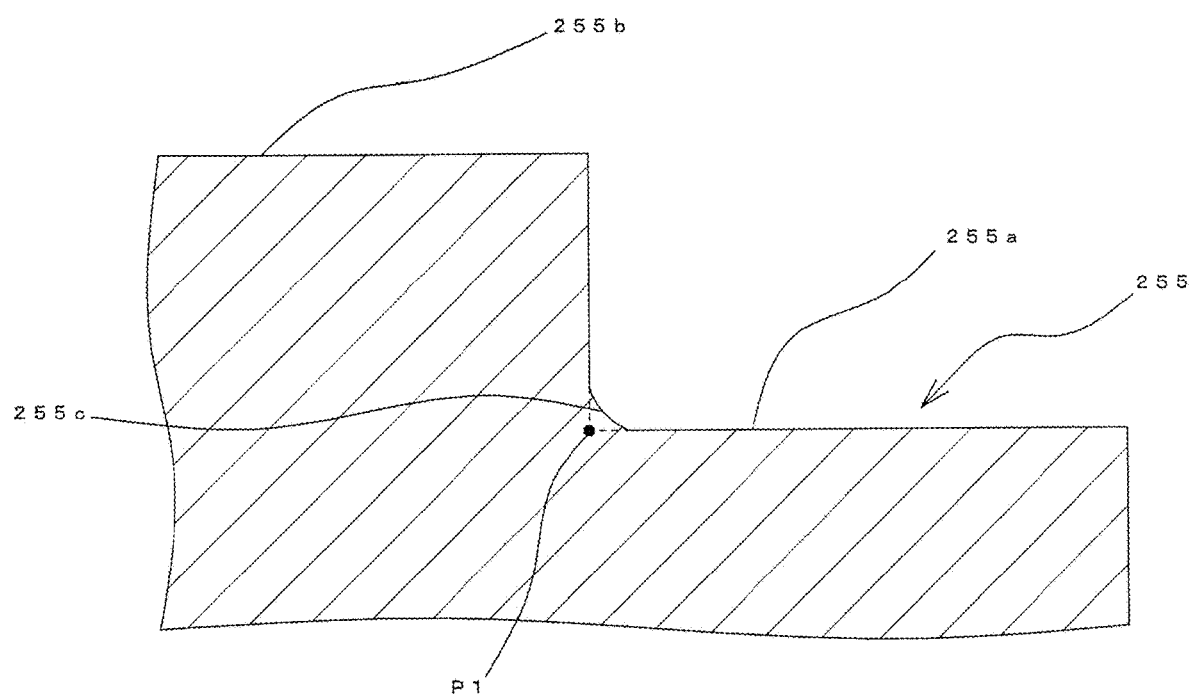
FIG. 7 is a sectional view illustrating a part of a rear end in a longitudinal section of a shaft in a general rotating machine.
Figure 8:
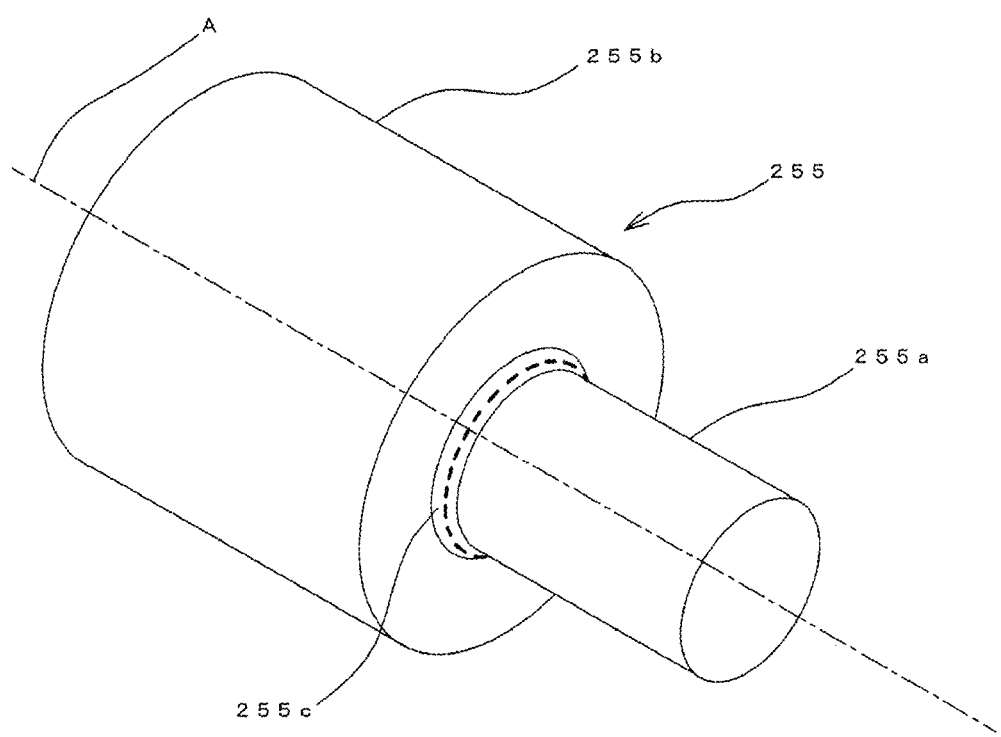
FIG. 8 is a perspective view illustrating the rear end in the axial direction of the shaft.

FIG. 7 is a sectional view illustrating a part of a rear end in a longitudinal section of a shaft 255 in a general rotating machine. FIG. 8 is a perspective view illustrating the rear end in the axial direction of the shaft 255. The chamfered portion (for example, 64c in FIG. 4) of the rear roller bearing that is not illustrated abuts on a rear boundary portion 255c of the shaft 255.

A point indicated by reference sign P1 in FIG. 7 is a virtual rising point given when a rising angle of a large-diameter portion 255b from a rear supported portion 255a is assumed to be a right angle. On the outer side (rear side) in the axial direction with respect to the virtual rising point P1, the rear boundary portion 255c starts rising from the outer circumferential surface of the rear supported portion 255a, and rises in an arc shape like a mirror surface of a concave mirror.

In FIG. 8, the arc drawn by the thick dotted line indicates the region where the stress applied by the contact with the chamfered portion of the rear roller bearing is maximized in the rear boundary portion 255c. The present inventors simulated the stress acting on the rear boundary portion 255c and found that the stress acting on the aforementioned region was 17.155 Mpa.

If the radius of curvature of the rear boundary portion 255c is made larger, the contact area between the rear boundary portion 255c and the chamfered portion of the rear roller bearing becomes larger, so that stress concentration can be relieved. However, in order to further increase the radius of curvature of the rear boundary portion 255c while aligning the position of the rear roller bearing in the axial direction with a target position, it becomes necessary to increase the diameter of the shaft 255.

Next, a characteristic configuration of the motor 1 according to the embodiment will be described.

Figure 5:
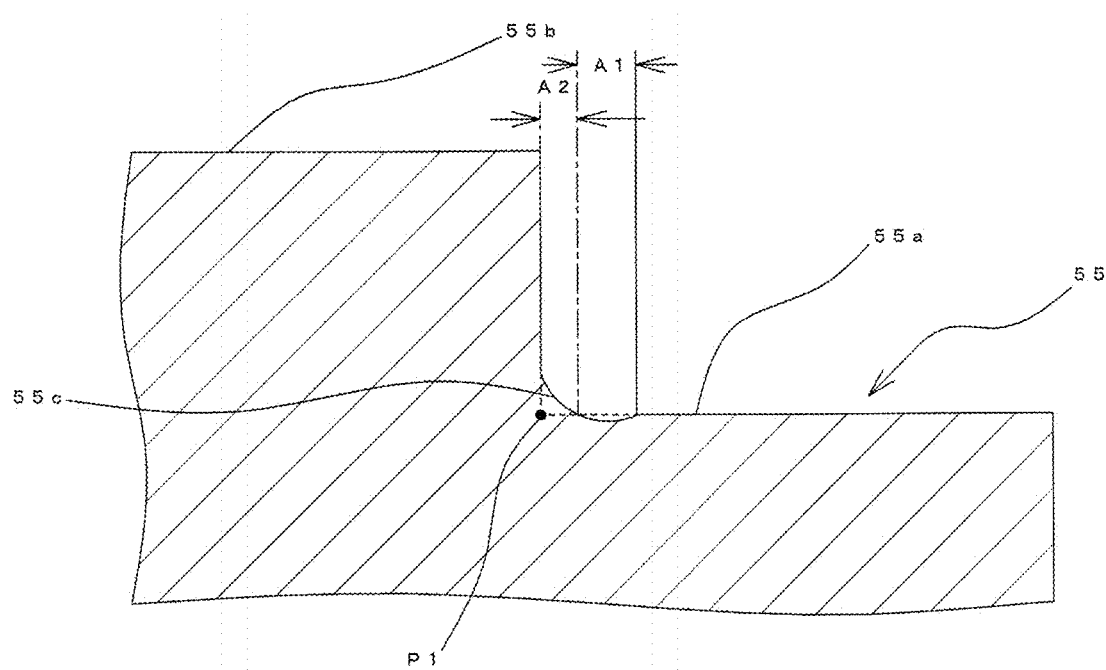
FIG. 5 is a sectional view illustrating a part of the rear end in a longitudinal section of the shaft in the motor according to the embodiment.
Figure 6:
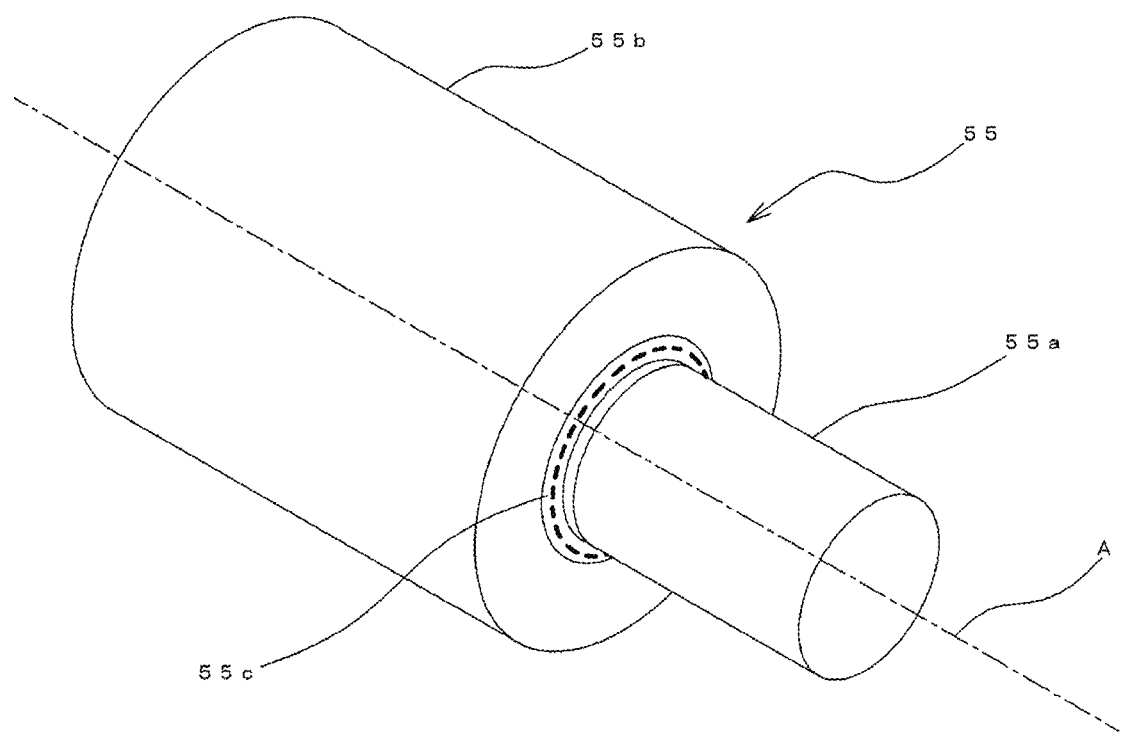
FIG. 6 is a perspective view illustrating the rear end in the axial direction of the shaft in the motor.

FIG. 5 is a sectional view illustrating a part of the rear end in a longitudinal section of the shaft 55 in the motor 1 according to the embodiment. FIG. 6 is a perspective view illustrating the rear end in the axial direction of the shaft 55 in the motor 1. The chamfered portion (64c in FIG. 4) of the rear roller bearing abuts on the rear boundary portion 55c of the shaft 55.

A point indicated by reference sign P1 in FIG. 5 is a virtual rising point given when a rising angle of the large-diameter portion 55b from the rear supported portion 55a is assumed to be a right angle. The rear boundary portion 55c is curved in an arc shape like a mirror surface of a concave mirror. The rear boundary portion 55c includes a recessed portion and a raised portion. The recessed portion is recessed inward in the radial direction from an outer edge in the radial direction of the rear supported portion 55a at a position (first region A1 in the axial direction) on the outer side (rear side) in the axial direction with respect to the raised portion. In addition, the raised portion is raised outward in the radial direction from the outer edge in the radial direction of the rear supported portion 55a at a position (second region A2 in the axial direction) on the inner side (front side) in the axial direction with respect to the recessed portion. The radius of curvature of the recessed portion and the radius of curvature of the raised portion are substantially the same.

The chamfered portion (64c in FIG. 4) of the rear roller bearing abuts on the raised portion out of the recessed portion and the raised portion in the rear boundary portion 55c.

As can be seen from the comparison between FIGS. 7 and 5, the radius of curvature of the rear boundary portion 55c of the shaft 55 according to the embodiment is larger than the radius of curvature of the rear boundary portion 255c of the general shaft 255. As a result, in the shaft 255, the contact area between the rear boundary portion 55c and the chamfered portion (64c in FIG. 4) of the rear roller bearing is larger than the contact area between the rear boundary portion 255c of the general shaft 255 and the chamfered portion of the rear roller bearing. With the shaft 55 having such a configuration, stress concentration to the rear boundary portion 55c is relieved by increasing the contact area between the rear boundary portion 55c and the chamfered portion of the rear roller bearing, so that it is possible to suppress damage to the shaft 55 without increasing the diameter of the shaft 55.

In FIG. 6, the arc drawn by the thick dotted line indicates the region where the stress applied by the contact with the chamfered portion (64c in FIG. 4) of the rear roller bearing is maximized in the rear boundary portion 55c. The present inventors simulated the stress acting on the rear boundary portion 55c and found that the stress acting on the aforementioned region was 16.972 Mpa and was smaller than the stress in the general shaft. From this result, it was confirmed that the present invention is effective.

The rear boundary portion 55c of the shaft 55 has been described, but the front boundary portion 55e also has an arc shape similar to that of the rear boundary portion 55c. That is, the shape of the front boundary portion 55e is an arc shape that is, on the outer side in the axial direction with respect to the virtual rising point, recessed inward in the radial direction from the outer edge in the radial direction of the front supported portion 55d, and then raised outward in the radial direction from the outer edge, as the arc shape extends from the outer side to the inner side in the axial direction.

Each of the rear boundary portion 55c and the front boundary portion 55e is configured as follows. That is, the sectional shapes of the boundary portions (55c, 55e) in a plurality of respective longitudinal sections obtained by breaking the shaft 55 at different positions in the circumferential direction are configured to be identical to each other. As a result, at each of the rear boundary portion 55c and the front boundary portion 55e, damage due to the contact with the chamfered portion of the roller bearing can be suppressed over the entire area in the circumferential direction.

Figure 9:
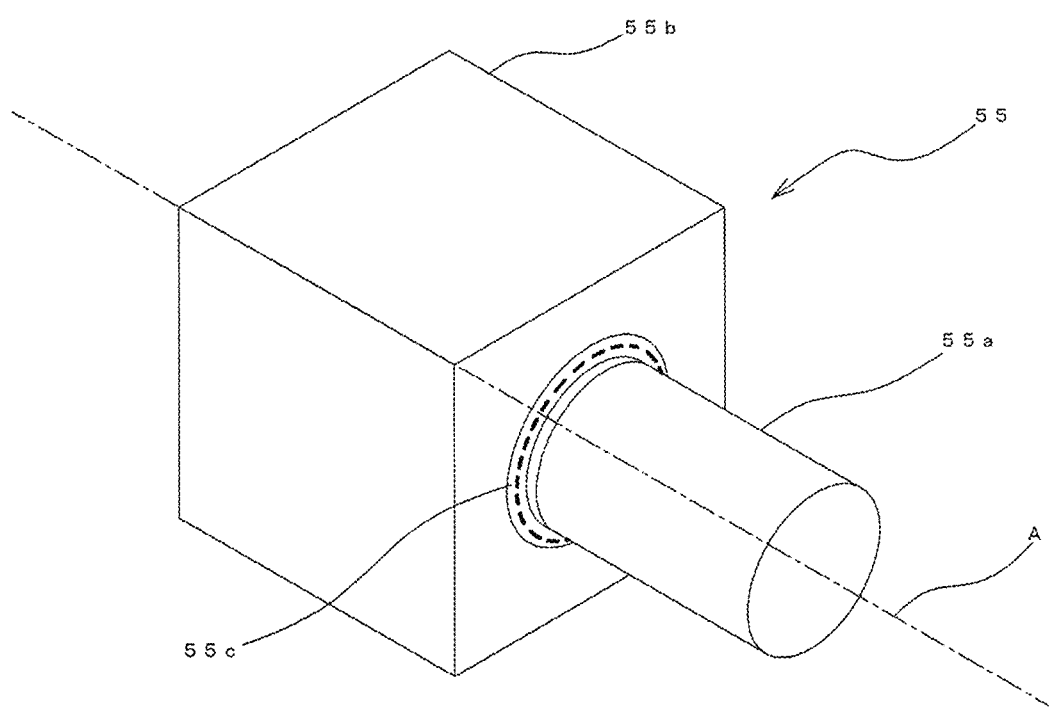
FIG. 9 is a perspective view illustrating a rear end in an axial direction of a shaft according to a modification.

The example of the shaft 55 in which the shape of the large-diameter portion 55b is a cylindrical columnar shape has been described, but the shape of the large-diameter portion 55b may be a polygonal columnar shape such as a quadrangular prism as in a shaft 55 according to a modification illustrated in FIG. 9.

An example in which the present invention is applied to an IPMSM (interior permanent magnet synchronous motor) has been described, but the present invention can also be applied to an inner-rotor rotating machine other than the IPMSM.

An example in which the present invention is applied to the motor 1 as a rotating machine has been described, but the present invention may be applied to a generator (dynamo) as a rotating machine.

The present invention is not limited to the above-described embodiment, and a configuration different from the embodiment can be adopted within the scope where the configuration of the present invention is applicable. The present invention has a specific effect for each aspect described below.

First Aspect

A first aspect is a shaft (for example, the shaft 55) including: a supported portion (for example, the rear supported portion 55a and the front supported portion 55d) that is rotatably supported by a bearing (for example, the rear roller bearing 61 and the front roller bearing 65); and a large-diameter portion (for example, the large-diameter portion 55b) that is disposed closer to a center in an axial direction than the supported portion is, is adjacent to the supported portion, and has a larger diameter than the supported portion, the shaft being configured to rotate integrally with a rotor (for example, the rotor 2) while holding the rotor, in which, a sectional shape of a boundary portion between the supported portion and the large-diameter portion in a longitudinal section of the shaft is an arc shape that is, on an outer side in the axial direction with respect to an a virtual rising point (for example, the virtual rising point P1) in the axial direction, the virtual rising point being given when a rising angle of the large-diameter portion from the supported portion is assumed to be a right angle, recessed inward in a radial direction from an outer edge in the radial direction of the supported portion and then raised outward in the radial direction from the outer edge, as the arc shape extends from the outer side to an inner side in the axial direction.

In the shaft according to the first aspect, the boundary portion with a curved shape including the recessed portion that is recessed inward in the radial direction from the outer edge in the radial direction of the supported portion and the raised portion that is raised outward in the radial direction make the radius of curvature of the arc shape large as compared with a general boundary portion including only a raised portion without including a recessed portion. As a result, according to the first aspect, increasing the contact area between the boundary portion and the chamfered portion of the inner ring of the roller bearing suppresses stress concentration to an abutment portion between the boundary portion and the chamfered portion without increasing the diameter of the shaft, so that it is possible to suppress damage to the shaft.

Second Aspect

A second aspect is the shaft having the configuration of the first aspect, in which sectional shapes of a plurality of the boundary portions in a plurality of respective longitudinal sections obtained by breaking the shaft at different positions in a circumferential direction are identical to each other.

According to the second aspect, the stress concentration due to the contact with the chamfered portion of the inner ring of the bearing is suppressed over the entire area in the circumferential direction of the boundary portion, so that it is possible to suppress damage to the shaft over the entire area in the circumferential direction.

Third Aspect

A third aspect is a shaft having the configuration of the first aspect or the second aspect, the shaft further including, as the supported portion: a one-side supported portion (for example, the rear supported portion 55a) disposed on one side in the axial direction and an other-side supported portion (for example, the front supported portion 55d) disposed on another side in the axial direction, in which each of the sectional shape of a boundary portion between the one-side supported portion and the large-diameter portion and the sectional shape of a boundary portion between the other-side supported portion and the large-diameter portion is an arc shape that is recessed and then raised.

According to the third aspect, with respect to each of the one-end supported portion and the other-end supported portion of the shaft, it is possible to suppress damage due to the contact with the chamfered portion of the inner ring of the bearing.

Fourth Aspect

A fourth aspect is a rotating machine including: a rotor; a stator (for example, the stator 3) that accommodates the rotor in a hollow space of the stator; and a shaft that rotates integrally with the rotor while holding the rotor, in which the shaft is the shaft according to any one of the first aspect to the third aspect.

According to the fourth aspect, it is possible to suppress damage to the shaft without increasing the diameter of the shaft installed in the rotating machine.

INDUSTRIAL APPLICABILITY

The present invention is applicable to a shaft and a rotating machine such as a motor and a dynamo.

REFERENCE SIGNS LIST

1 Motor (rotating machine)
2 Rotor
3 Stator
55 Shaft
55a Rear supported portion (one-side supported portion)
55b Large-diameter portion
55c Rear boundary portion (one-side boundary portion)
55d Front supported portion (other-side supported portion)
55e Front boundary portion (other-side boundary portion)
P1 Rising point

The invention claimed is:

1. A shaft comprising: a supported portion that is rotatably supported by a bearing; and a large-diameter portion that is disposed closer to a center in an axial direction than the supported portion is, is adjacent to the supported portion, and has a larger diameter than the supported portion, the bearing being disposed such that a side surface of the bearing faces and comes close to an end face of the large-diameter portion on a side of the supported portion, the shaft being configured to rotate integrally with a rotor while holding the rotor, wherein
a cross-sectional shape of a boundary portion between the supported portion and the large-diameter portion in a longitudinal section of the shaft is formed in an arc shape that, on an outer side in the axial direction with respect to a virtual rising point, the virtual rising point being given when a rising angle of the large-diameter portion from the supported portion is assumed to be a right angle, has a radius of curvature larger than a radius of curvature of a concave corner formed by an outer edge of the supported portion and the end face of the large-diameter portion and is recessed inward in a radial direction of the supported portion.

2. The shaft according to claim 1, wherein
cross-sectional shapes of a plurality of said boundary portions in a plurality of said longitudinal sections cut at mutually different positions in a circumferential direction are identical to each other.

3. The shaft according to claim 1, further comprising, as the supported portion:
a one-side supported portion disposed on one side in the axial direction; and an other-side supported portion disposed on another side in the axial direction, wherein
the bearing is disposed to each of the one-side supported portion and the other-side supported portion such that the side surface of the bearing faces and comes close to the end face of the large-diameter portion, and each of a cross-sectional shape of a boundary portion between the one-side supported portion and the large-diameter portion and a cross-sectional shape of a boundary portion between the other-side supported portion and the large-diameter portion is formed in an arc shape that has a radius of curvature larger than a radius of curvature of a concave corner formed by an outer edge of each of the one-side supported portion and the other-side supported portion and the end face of the large-diameter portion and is recessed inward in a radial direction of each of the one-side supported portion and the other-side supported portion.

4. A rotating machine comprising: a rotor; a stator that accommodates the rotor in a hollow space of the stator; and a shaft that rotates integrally with the rotor while holding the rotor, wherein
the shaft is the shaft according to claim 1.

* * * * *